United States Patent [19]

Thakar et al.

[11] Patent Number: 4,893,903

[45] Date of Patent: Jan. 16, 1990

[54] FLASHING ADVISORY SIGN

[75] Inventors: David H. Thakar, Alamo; Michael N. Thakar, Oakland, both of Calif.

[73] Assignee: Taliq Corporation, Sunnyvale, Calif.

[21] Appl. No.: 856,356

[22] Filed: Apr. 28, 1986

Related U.S. Application Data

[63] Continuation-in-part of Ser. No. 731,412, May 6, 1985, abandoned.

[51] Int. Cl.[4] .......................... G02F 1/13; G09F 9/00

[52] U.S. Cl. ............................. 350/331 R; 350/334; 350/336; 350/334 R; 350/338; 350/345; 340/784; 40/575; 40/448; 40/606

[58] Field of Search .................. 350/334, 336, 331 R, 350/339 R, 338, 345; 40/575-577, 448, 447, 606; 340/784, 716

[56] References Cited

U.S. PATENT DOCUMENTS

| | | | |
|---|---|---|---|
| 3,499,112 | 3/1967 | Heilmeier et al. | 350/331 R |
| 3,905,682 | 9/1975 | Meyerhofer | 350/338 |
| 4,071,912 | 2/1978 | Budmiger | 2/8 |
| 4,088,992 | 5/1978 | Kmetz et al. | 350/345 |
| 4,268,126 | 3/1981 | Mumford | 350/331 R |
| 4,289,383 | 9/1981 | Schwarzchild | 350/334 |
| 4,408,836 | 10/1983 | Kikuno | 350/334 |
| 4,435,047 | 3/1984 | Fergason | 350/334 |
| 4,457,589 | 7/1984 | Tamura et al. | 350/336 |
| 4,514,920 | 5/1985 | Shafrir et al. | 350/334 |
| 4,541,692 | 9/1985 | Collins et al. | 350/339 |
| 4,562,433 | 12/1985 | Biferno | 340/784 X |
| 4,579,423 | 4/1986 | Fergason | 350/334 |
| 4,580,876 | 4/1986 | Stolov et al. | 350/339 R |
| 4,606,611 | 8/1986 | Fergason | 350/334 |
| 4,613,207 | 9/1986 | Fergason | 350/334 |
| 4,707,080 | 11/1987 | Fergason | 350/334 |

FOREIGN PATENT DOCUMENTS

| | | |
|---|---|---|
| 32023804 | 1/1982 | Fed. Rep. of Germany . |
| 2228234 | 4/1974 | France . |
| 1457531 | 9/1973 | United Kingdom . |

*Primary Examiner*—Stanley D. Miller
*Assistant Examiner*—Huy K. Mai
*Attorney, Agent, or Firm*—Flehr, Hohbach, Test, Albritton & Herbert

[57] ABSTRACT

A apparatus for providing a motorist advisory function similar to that of a flashing illuminated advisory sign, the apparatus having an electrically operable optical shutter positioned by means of a frame between one or more message signs and a viewing region. The optical shutter is made of a liquid crystal plastic material having a substantially opaque state, in which the message sign is not visible from a viewing region, and a transparent state in which the sign is visible over a relatively wide viewing angle. The state of the optical shutter is controlled by a flashing power supply circuit, the transparent state being achieved when power is applied to the optical shutter and the substantially opaque state being achieved when no power is applied. Several embodiments show use of the invention with conventional stationary message signs, a moveable message sign, and an embedded highway marker.

9 Claims, 8 Drawing Sheets

FLASHING ADVISORY SIGN

CROSS-REFERENCE TO RELATED APPLICATIONS

This application is a continuation-in-part of U.S. application Ser. No. 731,412 filed May 6, 1985, now abandoned.

BACKGROUND OF THE INVENTION

This invention relates to flashing advisory signs of the type frequently found in a vehicular traffic environment.

Advisory signs are widely used on highways to provide a variety of messages to motorists, such as intersection control information, highway condition information (both permanent and temporary) and traffic control information. The use of such signs has become so uniform that sign standards have been established for color, shape and size of such signs. These signs may be generally classified as stationary, temporary and moveable. Examples of stationary or fixed signs are such intersection control signs as STOP, DO NOT ENTER, and NO LEFT TURN, and advisory signs such as SCHOOL XING and FREEWAY ENTRANCE: these signs are typically affixed to a stanchion or post permanently anchored at the traffic intersection control or advisory site. Examples of temporary signs are signs such as MEN WORKING and DETOUR: these signs are usually temporarily installed at a work site on tripods or other suitable sign mounting devices and later removed. An example of a moveable sign is the sequentially operated directional arrow signs found on the back of transportation authority trucks or on trailers left at a construction site.

Traffic advisory signs commonly employ a reflective color background and message portion (the latter in words or symbols or a combination of both) adhered to a relatively stiff backing member, typically fabricated from metal. Some signs include the addition of one or more flashing illumination lamps in order to draw the attention of motorists to the advisory sign. Still other signs are entirely constructed from individual lamps arranged to form the message information, such as the arrowheads noted above.

Nonilluminated signs (i.e., standard signs with no flashing illumination lamp) have a lower threshold of noticeability than signs provided with flashing illumination lamps or signs made from individual lamps forming the message when flashed. Nevertheless, the vast majority of advisory signs do not employ flashing illumination lamps, primarily for two reasons. Firstly, both the initial installation costs and the operating costs of signs employing flashing lamps is substantially higher than an ordinary sign, due to the necessity for a power connection to a flashing lamp sign, the increased maintenance required by lamp failures (either naturally or through vandalism), and the relatively high power consumption of AC operated lamps. With respect to the matter of cost, it is noted that flashing moveable signs (like those mounted on the rear of a truck or trailer) require a separate electrical power source, usually in the form of a diesel powered electrical generator, to operate the electrical lamps. Such independent power sources require periodic maintenance, are prone to theft and represent a relatively high capital investment per unit. Secondly, some signs are located in residential areas (such as DEAD END and STOP signs) and the repetitive flashing of the lamps throughout the night is annoying to those residing in the vicinity. Thus, even though signs provided with flashing illumination lamps are more desirable from a traffic safety standpoint, the deployment of such signs has been limited in the past.

Standard signs also suffer from the disadvantage that exposure to sunlight, rain, snow, mud and other environmental contaminants deteriorates the reflective substances forming the sign message. As a consequence, standard signs have an average useful lifetime in situ which is much shorter than the potential lifetime absent such exposure.

Flashing signs suffer from the disadvantage of being difficult to read or unnoticeable when exposed to direct unlight. In addition, the functional efficiency of such signs is relatively low. Specifically, that portion of a flashing sign which provides the visual stimulation to the motorist is the light bulb. For a typical single lamp flashing sign, the bulb has circular projected area of about one-third square foot (for a bulb with a diameter of about eight inches) while the sign itself has an area of at least nine square feet. For a typical arrowhead sign, each sign typically employs fifteen bulbs with a total projected area of about five and one-quarter square feet in a housing of eighteen square feet in area. In either case, the ratio of the bulb area to the sign area is relatively small.

SUMMARY OF THE INVENTION

The invention comprises an apparatus for providing a similar function to that of a flashing illuminated advisory sign, but which is devoid of the disadvantages noted above with conventional illuminated signs and which enjoys advantages not found in known signs.

In its broadest aspect, the invention comprises an electrically operable optical shutter means positioned between one or more message signs and a viewing region, and electrical power supply means coupled to the shutter means for sequentially controlling the shutter means between two operative states: a first state in which the transmission of light between the message and the viewing region is blocked and a second state in which the light path between the message and the viewing region is unblocked so that the message is visible in the viewing region. The optical shutter means comprises one or more planar sheets of liquid crystal material, each sheet having a pair of electrically conductive strips located along different edges for enabling electrical connection with the power supply means.

The optical shutter means is positioned with respect to the message signs by a spacer means, which maintains a suitable separation distance between the message sign and the shutter means to provide an optimum shutter effect.

In a first embodiment of the invention designed for use with a single message sign, the spacer means comprises a frame having suitable means for mechanically coupling the device to a conventional advisory sign, either permanently or in a detachable manner, depending on the nature of the application. The frame is provided with a forward flange portion and a rearwardly spaced mounting member for receiving the planar shutter sheet. Preferably, the planar sheet, which is relatively flexible, is adhered to a transparent stiffener member or is laminated between two transparent stiffener members, and the combination of the stiffener members and the sheet is received between the forward flange portion and the mounting member.

In an alternate embodiment of the invention, designed for use as a highway lane marker or the equivalent, the spacer means comprises a hollow housing having a bottom portion with an innersurface on which a flat strip of marker material is received. The housing has upstanding sidewalls terminating in a top surface on which the optical shutter sheet is received. A protective transparent top member is received over the shutter sheet, the top member preferably comprising a glass block secured to the housing to seal the interior thereof. The optical shutter sheet is provided with the edge conductive strips, and a pair of electrical conductive leads are coupled between the conductive strips and the power supply, which may be either located within the housing or externally thereof.

In another alternate embodiment of the invention, designed for use with two or more message signs, a plurality of optical shutter sheets is provided, each sheet being positioned between a different message sign and the viewing region so that the light path between each sign and the viewing region can be individually controlled by the power supply means. The spacer means comprises a frame having a pair of front flange portions and a central flange portion located between the two front flange portions, and a plurality of mounting members are provided to enable physical mounting of the individual shutter sheets in their respective locations. Preferably, the frame is provided with a pair of rear flange portions and a rear central flange portion with appropriate channels for providing a mounting mechanism for the message signs, which may be permanently or removably installed in the frame.

In yet another embodiment of the invention, the optical shutter may be utilized in conjunction with a retroreflective substrate having a visible message. The retroreflective substrate may be directly coupled to the optical shutter.

Still another embodiment of the invention is a message display comprising a retroreflective substrate without a message and a patterned optical shutter. The patterned optical shutter forms the message.

A further embodiment is an advisory sign having a visible message portion, a border about the message portion, and an optical shutter for alternately blocking and transmitting light between the border and a viewing area. The optical shutter provides a "halo" effect about the message portion.

Certain of the above embodiments may be modified by including a second optical shutter means positioned between the first optical shutter means and the one or more message signs with which the device is designed to be used. The purpose of the second optical shutter means is to provide additional blocking of the light path in those applications in which frontal illumination of a single optical shutter means is sufficiently strong to cause bleedthrough, which may be undesirable in some applications, of the one or more message signs.

Embodiments of the invention provide a functional capability which is similar to that of a flashing illuminated advisory sign in that the message is alternately visible and not visible in the viewing region forward of the sign. In addition, embodiments of the invention provide a protective enclosure for the sign to screen it from the usual atmospheric contaminants and to reduce the incidence of sunlight on the sign, thereby prolonging the lifetime of the sign. Moreover, since the power supply means for sequentially operating the optical shutter means can be designed to consume relatively small amounts of electrical power, the cost of operating the device is substantially less than the cost of operating a flashing illuminated lamp sign. Still further, the invention is compatible with all conventional permanent or temporary advisory signs, and may also be used with unique message signs, depending on the nature of the application. In addition, since the invention does not rely upon positive illumination of the sign, but rather on an optical shuttering effect, there is no flashing ambient light associated with the invention and thus no residential annoyance as with conventional illuminated flashing signs. Still further, moveable signs fabricated according to the invention possess message flexibility, in that the message portion of the sign can be readily changed without altering the remainder of the structure. Moreover, the marker embodiment can be arranged in a sequentially operated array to provide visual motorist direction control information, while all stationary embodiments are compatible with some existing traffic control systems to provide remote controlled operation. In addition, the ratio of the active sign area to the total sign area in all embodiments is extremely large, on the order of at least eighty-five percent.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
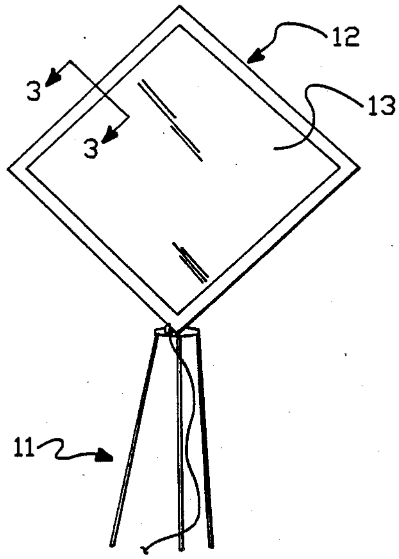
FIG. 1 is a front view of first embodiment of the invention with the optical shutter in the blocked state.
Figure 2:
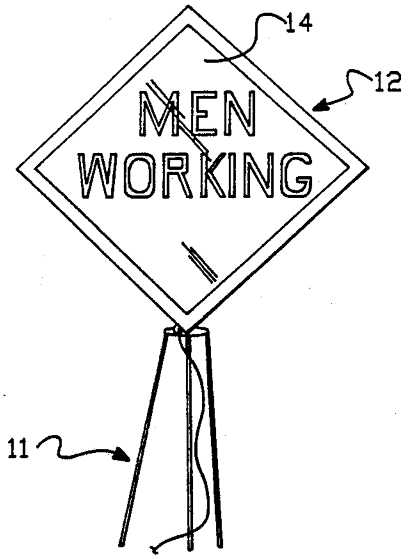
FIG. 2 is a view similar to FIG. 1 showing the optical shutter in the light transmitting state.

Turning now to the drawings, FIG. 1 illustrates a first embodiment of the invention designed for use with a temporary advisory sign (hidden from view in FIG. 1) mounted on a conventional tripod stand 11. As seen in FIG. 1, the invention comprises a frame generally designated with reference numeral 12 and an optical shutter assembly generally designated with reference numeral 13. As described more fully below, optical shutter assembly 13 is electrically driven between two different optical states: the blocked state illustrated in FIG. 1 in which the advisory sign is not visible in the viewing region forward of the apparatus, and the transparent state illustrated in FIG. 2 in which the advisory sign 14 is clearly viewable through the optical shutter assembly 13.

Figure 3:
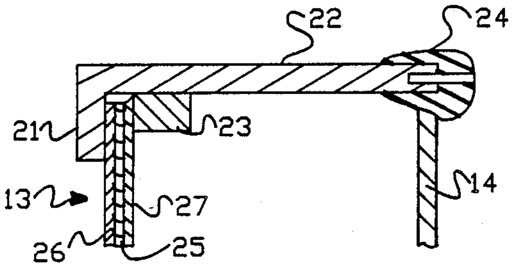
FIG. 3 is an enlarged sectional view taken along lines 3—3 of FIG. 1 illustrating one construction of the frame.

With reference to FIG. 3, the construction of frame 12 includes an inwardly turned forward flange portion 21 and a rearwardly extending wall portion 22 terminating in the rear edge on which a protective bumper 24 is located. The bumper 24 is designed to cushion mechanical contact with the edges of sign 14. A mounting bar 23 extending essentially parallel to forward flange 21 provides a mounting space for the optical shutter assembly 13. As seen in FIG. 3, shutter assembly 13 comprises an active two-state optical shutter sheet 25 laminated between a pair of protective transparent sheets 26, 27. Stiffener sheets 26, 27 may be fabricated from any transparent material which is resistant to shattering, such as acrylic or polycarbonate sheet material.

Figure 4:
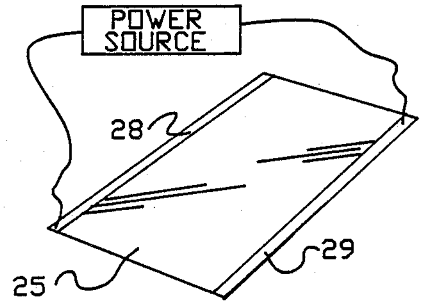
FIG. 4 is a schematic view of a portion of the optical shutter sheet illustrating the electrical connections thereto.

The heart of the optical shutter assembly 13 is the shutter sheet 25, which comprises a relatively thin liquid crystal material sold under the trademark OPTOfilm by Taliq Corporation of Mountain View, Calif. This material is described in detail in U.S. Pat. No. 4,435,047 issued Mar. 6, 1984, the disclosure of which is hereby incorporated by reference. Briefly, this material is normally substantially opaque to visible light and becomes transparent when subjected to an electrical field supplied by a power supply of appropriate voltage (described below). The liquid crystal material is relatively durable and maintains its two-state optical properties even when punctured and is thus relatively vandal proof. Durability of the assembly 13 is enhanced by the provision of the transparent stiffener plates 26, 27 which prevents slashing of the sheet 25 by sharp instruments. If desired, a single outer protective sheet or plate 26 may be employed. Electrical connection between the shutter sheet 25 and the associated power supply is afforded by means of a pair of electrically conductive strips 28, 29 (see FIG. 4) mounted on opposite edges of the sheet 25. Conductive strips 28, 29 preferably comprise copper tape available from 3M Corporation.

Figure 5:
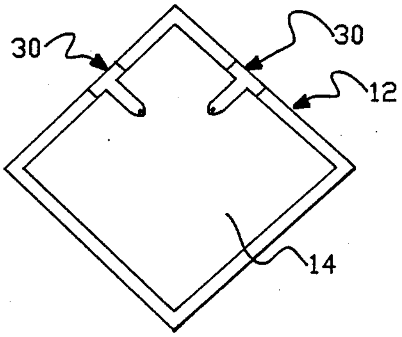
FIG. 5 is a rear view of the embodiment of FIG. 1 illustrating one form of hanger.
Figure 6:
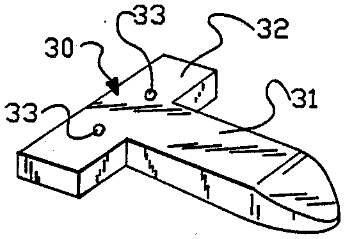
FIG. 6 is a perspective view of the hanger shown in FIG. 5.

With reference to FIGS. 5 and 6, when used with a temporary advisory sign the frame 12 is provided with suitable hangers adapted to clasp the rear edge of the sign 14. The hanger shown in FIGS. 5 and 6 comprises an integral member generally designated with reference numeral 30 and having a T-shaped configuration with a leg portion 31 and a bar portion 32 provided with fastener apertures 33 to enable the hanger element 30 to be secured to the rear portion of the frame 12 using any suitable fastener such as screws or rivets. Other suitable hangers will occur to those skilled in the art.

When used with permanent signs, other types of conventional fasteners may be employed to permanently secure the frame 12 to the sign 14. Examples of such fasteners are screws, rivets, adhesives and the equivalent.

Although described more fully below in conjunction with FIG. 16, the power supply designed for use with the embodiment described above supplies 60 volts alternating current to the shutter sheet 25 by means of leads connected to the conductive strips 28, 29. The voltage is supplied sequentially with a 50% on, 50% off duty cycle, at a rate settable by a variable control. An example of a suitable range on the flash rate is from 0.15 to 0.95 second. When voltage is applied to the shutter sheet 25 the sheet is rendered optically transparent so that the message on sign 14 is visible through the optical shutter assembly 13. When voltage is denied optical sheet 25, the sheet becomes substantially opaque and has a diffuse white appearance so that the message on sign 14 is no longer visible. It should be noted that the viewing angle provided by shutter sheet 25 is relatively wide (on the order of 180°) so that restricted viewing angle is not a problem with the design.

Figure 7:
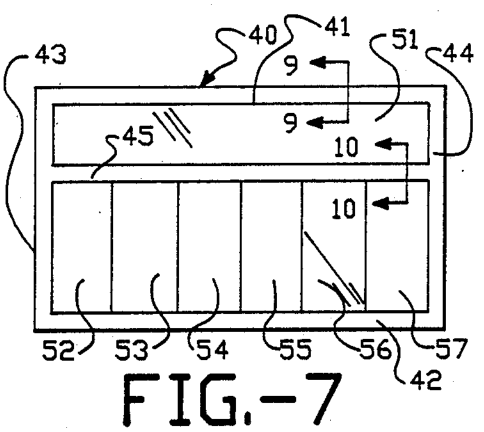
FIG. 7 is a front view of a alternate embodiment of the invention showing the optical shutters in the blocked state.
Figure 8:
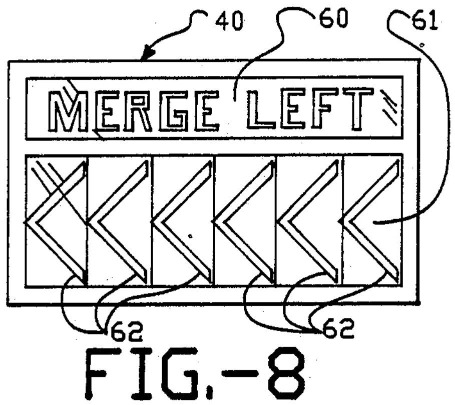
FIG. 8 is a view similar to FIG. 7 showing the device in the fully sequenced light transmitting state.

FIGS. 7–11 illustrate a second embodiment of the invention suitable for use with two or more independent message signs. This embodiment is specifically described in connection with a moveable sign application of the type usually encountered on the rear of a transportation crew vehicle located on a highway, or a trailer parked at a highway temporary construction site, and designed to advise motorists of the need to merge left in the region ahead of the truck or trailer. Conventional signs of this type employ incandescent bulbs mounted on a suitable background, typically reflective, arranged in the form of left-facing arrowheads designed to flash sequentially. The embodiment of the invention shown in FIGS. 7–11 provides an advantageous substitution for a sign of this type and, as seen in FIGS. 7 and 8 comprises a frame generally designated with reference numeral 40 formed in a rectangular shape with upper and lower flange portions 41, 42, side members 43, 44 and central frame portion 45. A plurality of independent optical shutter assemblies 51–57 are mounted in the frame, the upper shutter assembly 51 spanning the entire width of the frame 40 and the lower optical shutter assemblies 52–57 collectively spanning the lower width of the frame 40. With the shutter assemblies 51–57 in the unoperated state, the individual message signs located rearwardly of frame 40 are not visible to the viewing motorists in the viewing region. With all of the optical shutter assemblies 51–57 operated, all message signs are visible as show in FIG. 8. The upper message sign 60 bears the legend "MERGE LEFT", while the lower message sign 61 bears the left-facing arrowheads 62.

Figure 9:
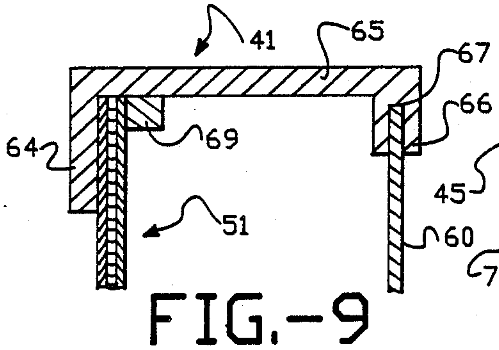
FIG. 9 is an enlarged sectional view taken along lines 9—9 of FIG. 7 illustrating the upper frame portion.

FIG. 9 illustrates the construction of the upper frame member 41 in cross section and, as seen in this FIG., member 41 has an inwardly turned front flange portion 64 and a side arm portion 65 extending rearwardly of the frame and terminating in an inwardly facing grooved wall portion 66 providing an upper generally U-shaped sign mounting channel 67 for receiving the upper edge of message sign 60. A rearwardly spaced mounting bar 69 extends generally parallel to front flange 64 along the length of member 41 to provide a mounting channel for receiving the upper edge of optical shutter assembly 51. The construction of lower member 42 of frame 40 is essentially identical to that of upper member 41, with a reverse configuration.

Figure 10:
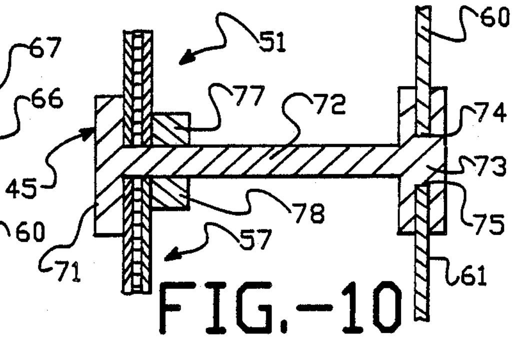
FIG. 10 is an enlarged sectional view taken along lines 10—10 of FIG. 7 illustrating the central frame portion.

FIG. 10 shows the cross sectional construction of central member 45 and, as seen in this FIG., member 45 has a forward bar section 71 and a rearwardly extending central web portion 72 terminating in a double ended end member 73 having slotted upper and lower mounting channels 74, 75 for respectively receiving the lower end of the upper message sign 60 and the upper end of lower message sign 61. A pair of mounting bars 77, 78 are provided respectively on the upper and lower surfaces of web 72 rearwardly of bar section 71 to provide a mounting channel for the lower edge of upper optical shutter assembly 51 and the upper edge of the lower optical shutter assemblies 52–57 (only the extreme right most optical shutter assembly 57 being viewable in FIG. 10).

Figure 11A:
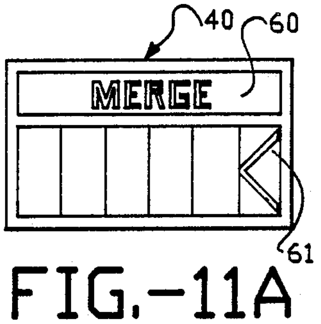
FIGS. 11A–11C are sequential frontal views illustrating a portion of the sequential operation of the embodiment of FIG. 7.
Figure 11B:
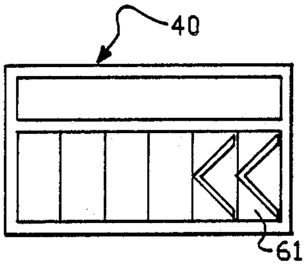
Figure 11C:
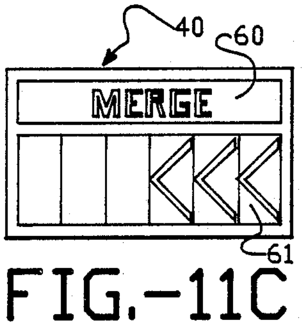

FIGS. 11A–11C illustrate the first three phases of one method of operation of this two-sign embodiment. With reference to FIG. 11A, when upper optical assembly 51 and the extreme right most lower optical shutter assembly 57 are activated, sign 60 and the right-most arrowhead portion of lower sign 61 are visible through their respective shutter assemblies. The remaining arrowheads on lower sign 61 are not visible due to the nonactivated state of shutter assemblies 52–56. Next, as viewed in FIG. 11B, upper optical shutter assemblies 51 is deactivated and lower optical shutter assemblies 56 and 57 are activated to display the two right-most arrowheads on the lower sign 61. Next, as shown in FIG. 11C upper optical shutter assembly 51 is again activated to display the upper message sign 60 and the three right-most lower optical shutter assemblies 55–57 are activated to display the three right-most arrowheads on lower message sign 61. In this mode of operation, the upper optical shutter assembly 51 is sequentially deactivated and activated and the remaining lower optical shutter assemblies 52–54 are activated to sequentially add the remaining arrowheads to the viewable portion of the display. When the extreme left optical shutter assembly 52 has been activated, the sequencer shown in FIG. 18 resets the system to deactivate each of the optical shutter displays 51–57 to block the light transmission of all portions of both message signs 60, 61, so that the device has the appearance as illustrated in FIG. 7. Thereafter, the sequence restarts from the display condition illustrated in FIG. 11A.

Since the optical shutter sheet 25 is not perfectly opaque in the deactivated state, some attention must be given to the relative spacing between the optical shutter assembly 13 (and assemblies 51–57) and the message sign 14 (and signs 60, 61). Generally speaking, with the liquid crystal material identified above a separation distance of less than one inch results in substantial message bleedthrough when a highly reflective message sign is used and the shutter film is in the deactivated state. The magnitude of the bleedthrough results in a lack of sufficient contrast between the activated and deactivated states to provide the desired function. For separation distances from about one inch to about two and one-half inches, the bleedthrough is reduced to a level which is generally acceptable. A separation distance from about two and one-half inches to about three inches produces sharper contrast between the two states of the shutter film with greatly diminished bleedthrough. Separation distances of from seven to eight inches produce no bleedthrough of the message sign and are recommended for applications in which the deactivated or off state is maintained for substantial periods of time. These separation distances may be reduced as the quality of the commercially available shutter film improves, and are thus exemplary values only.

Figure 12:
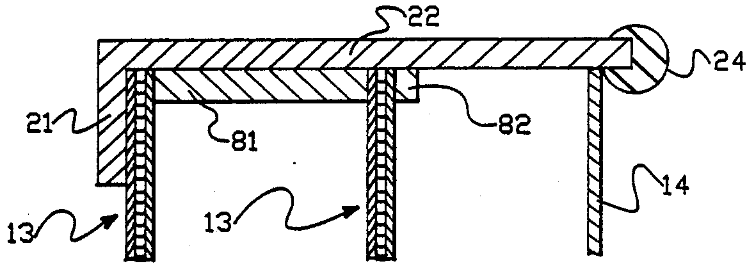
FIG. 12 is an enlarged sectional view similar to FIG. 3 illustrating an alternate embodiment of the invention employing two optical shutters.

For those applications in which physical depth of the frames 12, 40 is somewhat critical, a double shutter construction may be employed. With reference to FIG. 12, which is a view similar to FIG. 3, in the double shutter embodiment a second shutter assembly 13′ substantially identical in construction to shutter assembly 13 is placed rearwardly of shutter 13 and forwardly of the sign 14. A wider mounting member 81 may be employed in this configuration together with a second mounting member 82 which provides the requisite mounting channels for the two shutter assemblies 13, 13′. The two shutter assemblies 13, 13′ in this embodiment are operated in unison to have identical activated and deactivated cycle times.

Figure 13:
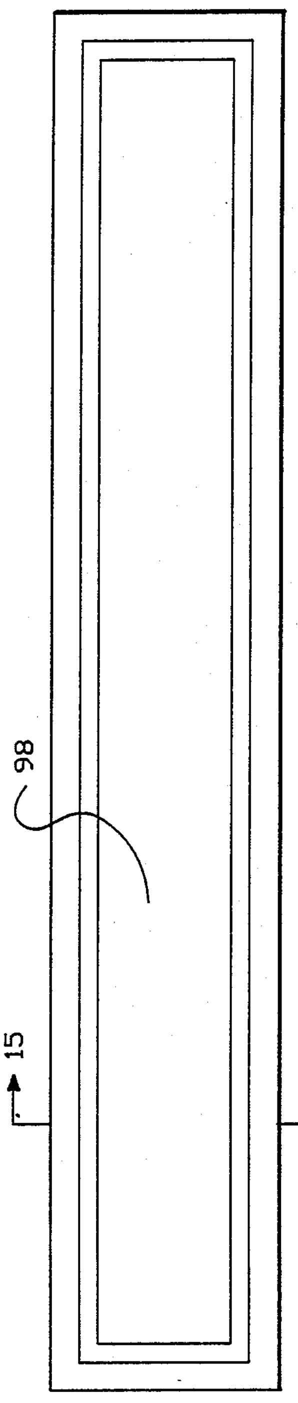
FIG. 13 is a top plan view of an alternate embodiment of the invention suitable for use as a highway lane marker.
Figure 14:
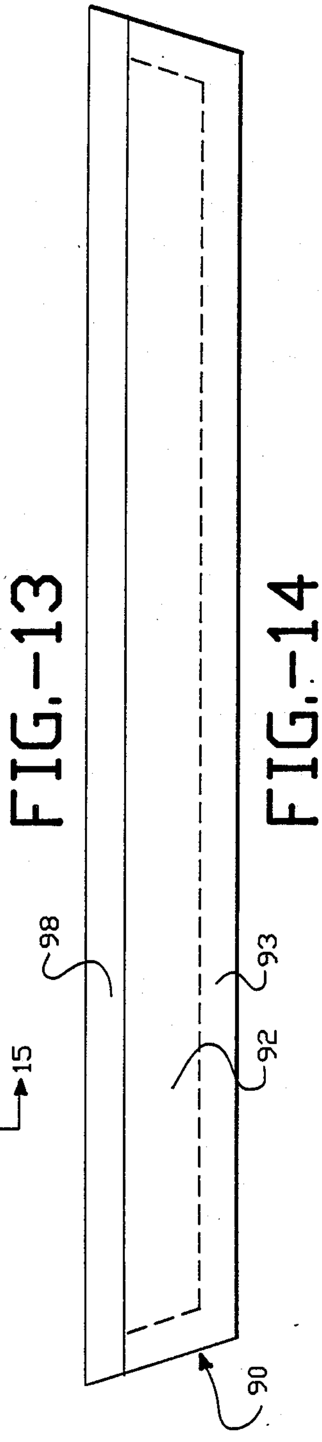
FIG. 14 is a side view of the embodiment of FIG. 13.
Figure 15:
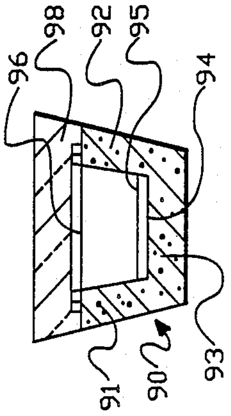
FIG. 15 is a sectional view taken along lines 15—15 of FIG. 13.

FIGS. 13–15 illustrate another embodiment of the invention designed for use as an embedded highway lane marker. As seen in these FIGS., a housing 90 having a trough-like shape and section has sloping upwardly extending sidewalls 91, 92 and a bottom portion 93 having an inner surface 94. Mounted on surface 94 is a marker element 95, which in the embodiment illustrated comprises a strip of yellow reflective material, preferably a material available from 3M Corporation under the trademark Scotchlite. An optical shutter assembly 96 essentially identical in construction to optical shutter assembly 13 is mounted on the top surface of the sidewall members 91, 92 of housing 90, and a transparent cover member 98 is secured to the top surfaces of sidewall members 91, 92 to provide a sealed enclosure. Housing 90 is preferably fabricated from concrete or some other relatively inexpensive durable material, while cover plate 98 is preferably fabricated from glass. Although not illustrated, the associated power supply may be included within the housing or located externally of the housing. Operation of the embodiment of FIGS. 13–15 is similar to that described above for the embodiment of FIG. 1. The embodiment shown in FIGS. 13–15 is designed to be embedded in a roadbed as a lane marker, and is intended to be used with a plurality of such devices arranged in a standard configuration essentially identical to that employed for the passive reflective lane markers currently in use throughout the highway system.

Figure 16:
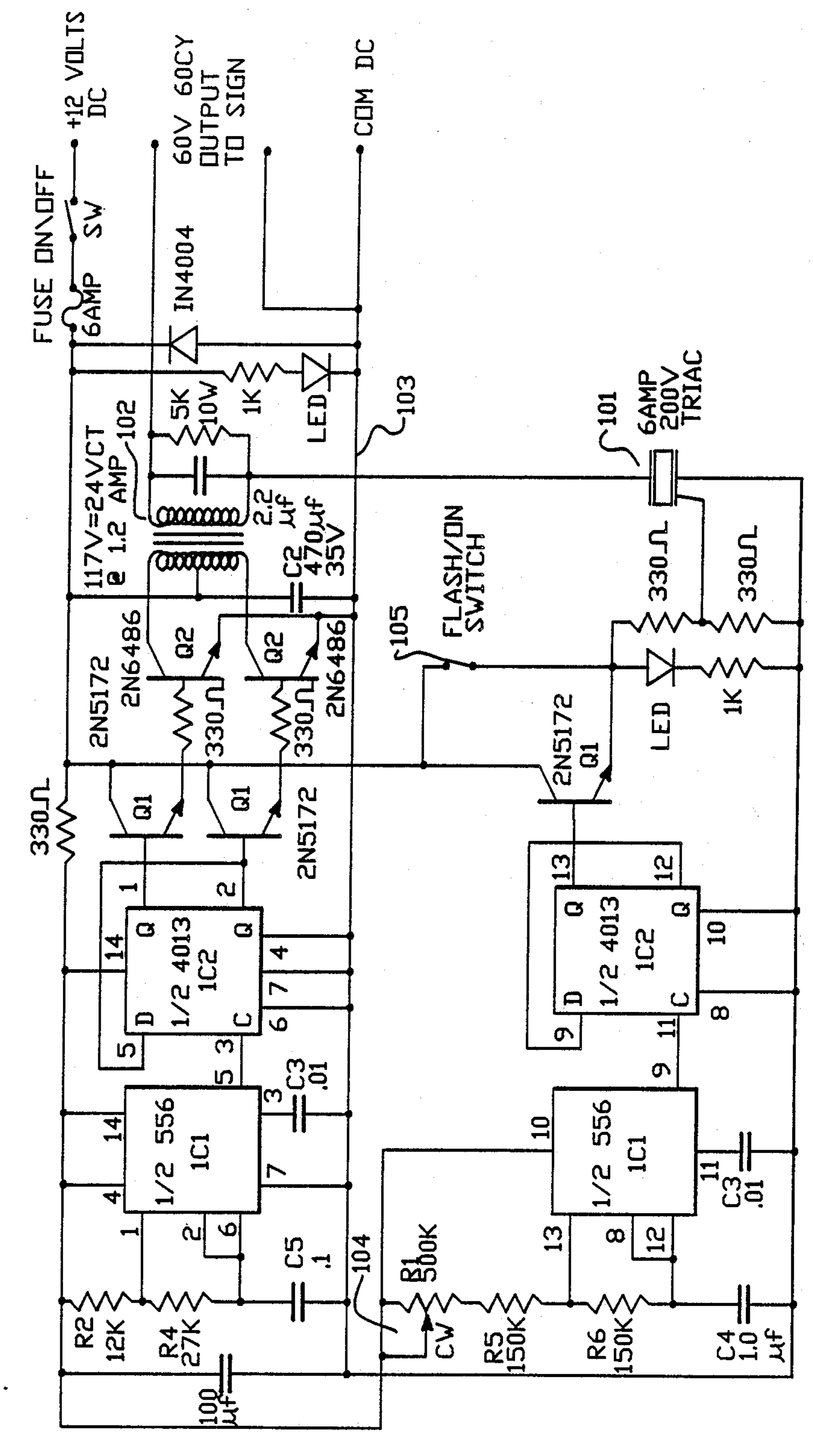
FIG. 16 is a schematic diagram of a power supply suitable for use with the embodiment of FIG. 1.

FIG. 16 illustrates a combination power supply/flasher circuit suitable for use with the embodiments of FIGS. 1 and 15. The upper portion of the circuit is a conventional converter circuit for supplying 60 volts AC at 60 cycles from a 12 volt DC power input from a suitable DC source, such as a 12 volt battery pack. The lower portion of the circuit is a flasher circuit which operates a triac 101 coupled between one side of a transformer secondary 102 and a common ground 103. When transistor Q1 is conducting, the triac 101 is actuated and the connection between the transformer and ground is completed; when transistor Q1 is a nonconducting, the triac 101 is deactivated and the AC power is removed from the output terminals to the sign. The flashing rate is controlled by a variable resistance 104 of the flasher circuit. In an alternate mode of operation, in which power is continuously applied to the sign, transistor Q1 is bypassed by a manually operable switch 105.

Figure 17:
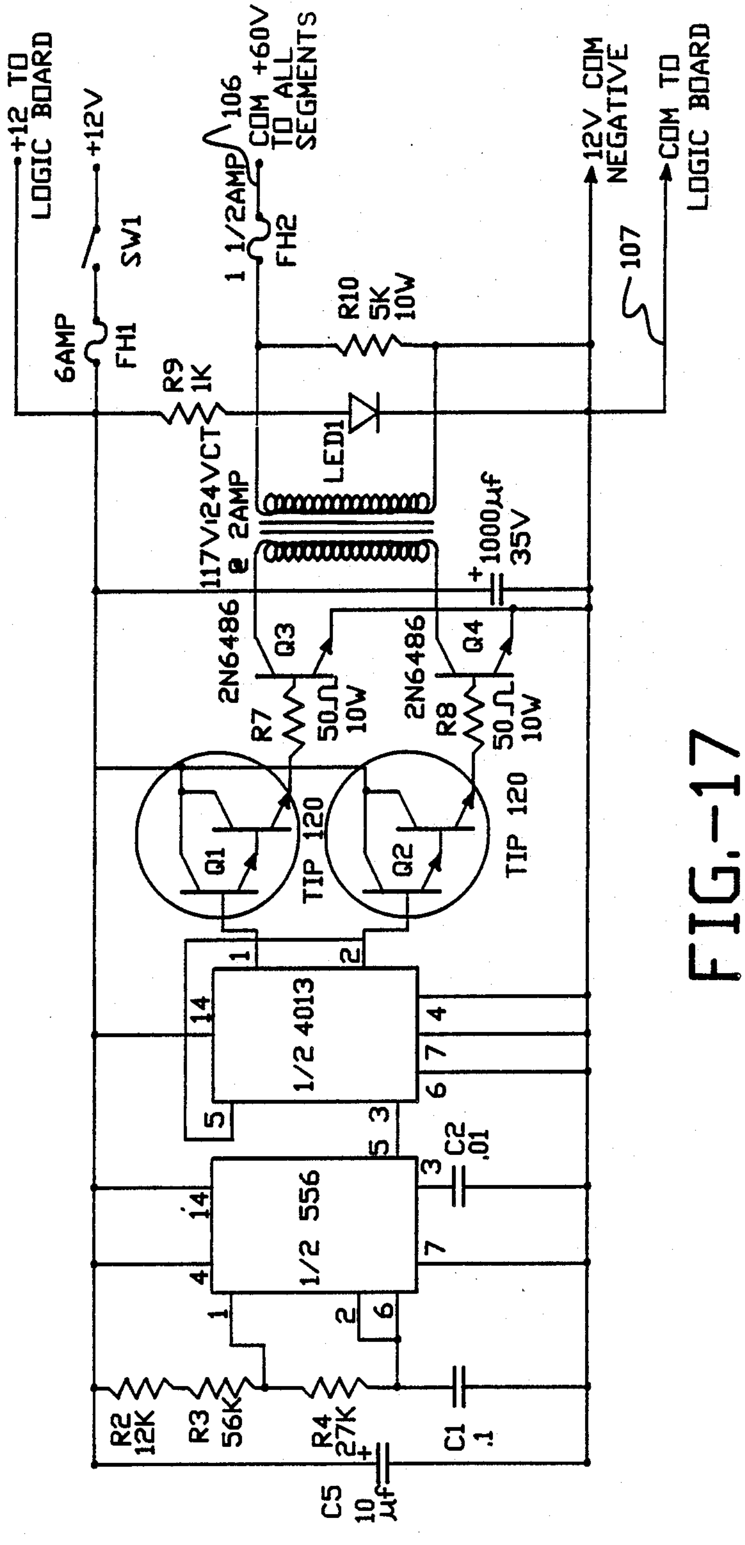
FIG. 17 is a schematic diagram of a power supply suitable for use with the embodiment of FIG. 7.

FIG. 17 illustrates a power supply circuit suitable for use with the multiple sign embodiment of FIG. 7. The circuit supplies 60 volts alternating current to all of the optical shutter assemblies 51–57 from a 12 volt DC input in the following fashion. One of the 60 volt AC output terminals 106 is coupled to one of the conducting strips on each of the optical shutter assemblies 51–57. The other terminal 107 is coupled to the individual triac elements 108–114 shown in the sequence logic diagram of FIG. 18 so that the triac elements 108–114 control the state of each of the optical shutter assemblies 51–57.

Figure 18A:
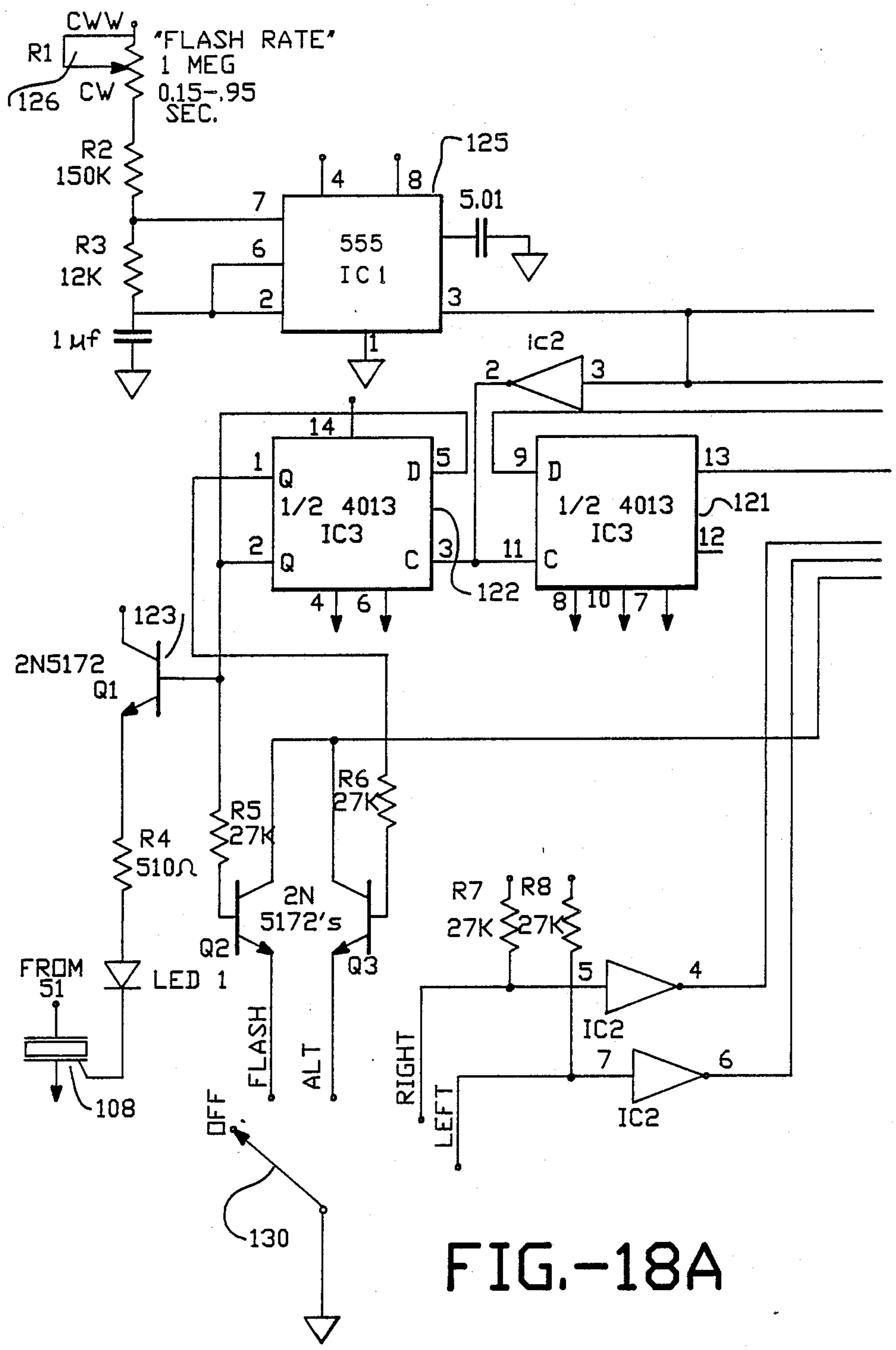
FIG. 18 is a schematic diagram of a sequencer circuit suitable for use with the embodiment of FIG. 7.
Figure 18B:
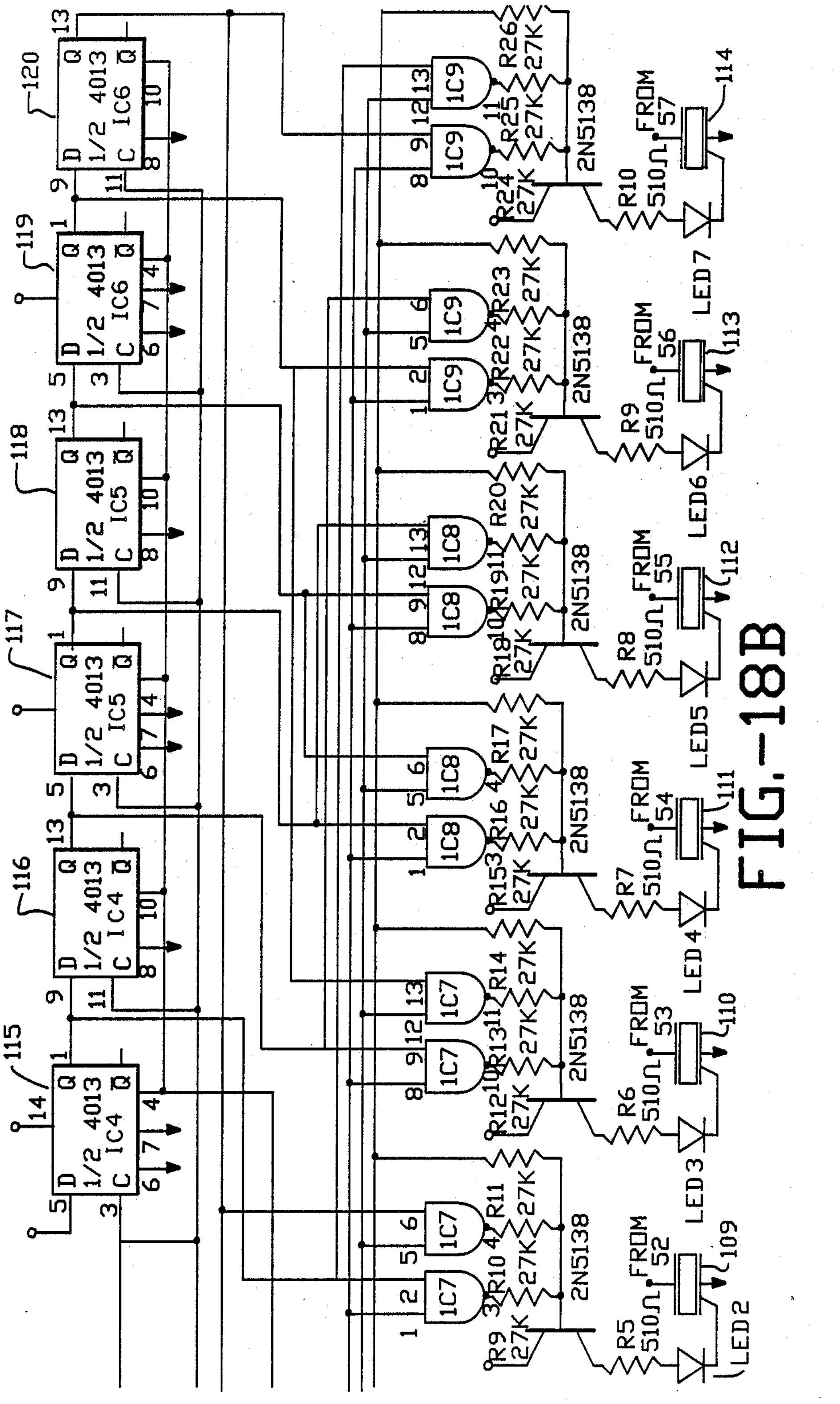

With reference to FIG. 18, the sequence logic includes six D-type flipflops 115–120 arranged as a six position shift register, and a separate D-type flipflop 121 which serves to reset the upper six D-type flipflops at the end of a full sequence. An additional D-type flipflop 122 is used to control the state of optical shutter assembly 51 via a transistor 123. All flipflops 115–122 are clocked by means of a type 555 timer 125 having an adjustment potentiometer 126 for setting the flash rate. The six triacs 109–114 shown on the bottom portion of FIG. 18 are used to individually control the state of optical shutter assemblies 52–57. Each triac is controlled by a dedicated transistor as shown, and each transistor is in turn controlled by a pair of NAND gates, only one of which is active during the right and left sequence functions. A function switch 130 is provided to enable sequencing of the optical shutter assemblies 52–57 from right to left or from left to right. In addition, the function switch 130 has a flash position in which the optical assemblies 51–57 are activated and deactivated in unison, and an alternate (ALT) position in which the state of the optical shutter assembly 51 is alternated with that of optical shutter assemblies 52–57.

As will now be apparent, the invention affords a number of advantages absent from conventional passive advisory signs and flashing illuminated advisory signs. Firstly, when used in conjunction with conventional passive advisory signs the invention provides a shutter function which is similar to the conventional flashing illumination function but which does not result in the annoying generation of ambient light. In addition, the power consumption of the invention is substantially less than that of conventional flashing illuminated signs using incandescent lamps. This lower power consumption is particularly advantageous for the multiple sign embodiment of FIG. 7 which can be operated by means of the 12 volt DC source normally available on a vehicle, as contrasted to known flashing lamp signs which require a relatively expensive separate power source. It should be noted that, unlike other electrically powered signs, no ballasts are required for signs fabricated in accordance with the invention, which eliminates a component which is subject to frequent replacement. Further, the invention is highly immune to vandalism damage due to the relative simplicity of construction and the operating characteristics of the shutter sheet material 25. Moreover, the lifetime of conventional advisory signs is prolonged when combined with the invention, which affords a protective covering for a conventional sign and which substantially reduces the amount of sunlight reaching the message face of the sign during the deactivated portion of the flashing cycle.

Still further advantages are found in signs fabricated in accordance with the invention. Since the shutter area of all signs comprises the entire area of the sign less the frame area, the functional efficiency is relatively large - on the order of eighty-five percent or greater. The result is a highly noticeable, attention getting sign message. Moreover, there is no "wash out" of the sign message in direct sunlight: in fact, the stronger the sunlight, the more contrast obtained between the activated and deactivated states and, during darkness, the greater the intensity of the approaching vehicle head lights, the greater the message contrast. In addition, all stationary applications of the invention can be remotely operated by existing traffic control systems having a remote control capability, by adding a simple control circuit to the flasher or sequence circuits. Further, the lane marker embodiment can be electrically operated in a manner similar to the sequentially operated shutter assemblies 52–57 to provide a sequenced array of markers conveying visual lane information (such as variable use commuter lanes) to motorists. Moreover, both moveable and stationary message embodiments provide great message flexibility in that a library of different message signs may be employed with a single frame construction of the type illustrated in FIGS. 7–10 for a two sign configuration, with a given sign being selected on the basis of the desired message function.

Figure 19:
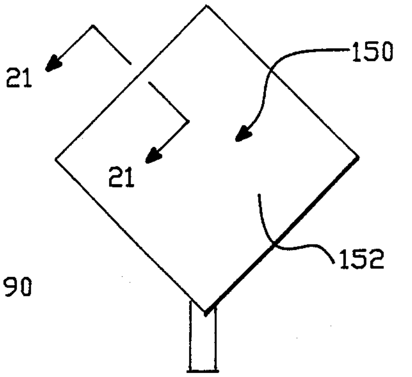
FIG. 19 is a schematic front view of another embodiment of the invention with the display obscured.
Figure 20:
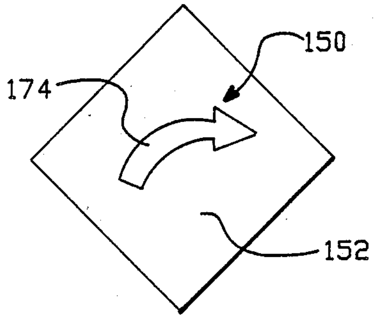
FIG. 20 is a view similar to FIG. 19 with the display visible.
Figure 21:
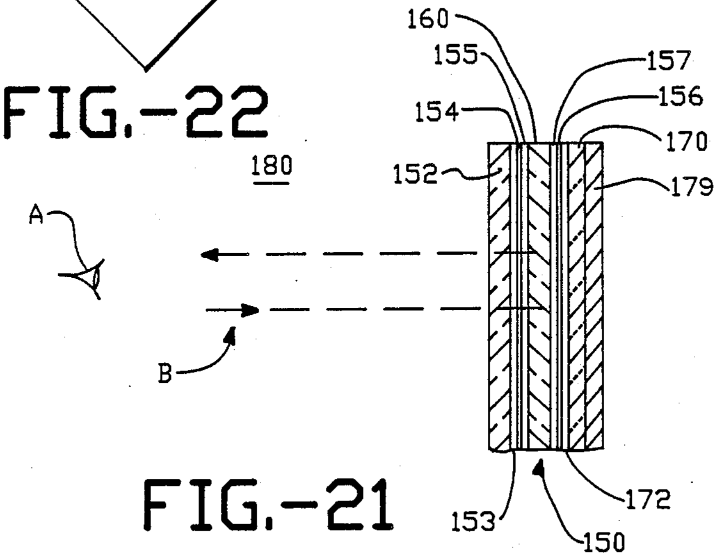
FIG. 21 is an enlarged sectional view taken along lines 21—21 of FIG. 19.

FIGS. 19–21 illustrate another embodiment of an advisory sign. This embodiment comprises an optical shutter assembly generally designated with reference numeral 150 directly coupled to a retroreflective substrate or sheeting 170. This embodiment may further include a front, protective cover 152 for protecting optical shutter 150 and other components of the sign from environmental conditions and vandalism. Cover 152 is made of an optically-transmissive material such as acrylic or polycarbonate. The cover may be coupled to the optical shutter by means of a lamination layer 153.

Optical shutter 150, as described heretofore, comprises a layer or layers of liquid crystal material 160 located between substrates 154 and 156. Electrodes 155 and 157 are located on substrates 154 and 156, respectively. The electrodes may be selectively energized to apply a prescribed input, for example, an electric field, across the liquid crystal material.

In the field-on condition (electric field applied), the liquid crystal material will transmit substantially all of the light incident thereon. In the field-off condition (no electric field), some of the incident light will be absorbed, but also some of the incident light will be scattered.

Substrates 154 and 156, and electrodes 155 and 157 are optically transparent so that optical shutter 150 is capable of controlling the transmission of light therethrough in response to the prescribed input. Substrates 154 and 156 may be flexible polyester films, such as Mylar ®, that have each been coated with a 90 to 500 ohms per square layer of indium tin oxide ("ITO") to form electrodes 155 and 157.

Optical shutter 150 is laminated to retroreflective substrate 170 by means of a lamination layer 172. There is very little if any air gap between the optical shutter and the retroreflective substrate. Lamination layers 153 and 172 are both optically transparent.

Substrate 170 is denominated retroreflective since light rays reflected from substrate 170 return along paths parallel to those of their corresponding incident rays. Retroreflective substrate 170 may comprise "Scotchlite" Brand Reflective Sheeting High Intensity Grade manufactured by the 3M Company, Traffic Control Materials Division, St. Paul, Minn. Other materials of similar quality may also be utilized. Collimated light incident on such retroreflective material is reflected back towards an observer A located at the source of collimated light in the viewing region 180 in front of the sign. The light path from the light source to the sign, and back to observer A is represented by light ray path B. The "Scotchlite" Brand retroreflective sheeting includes an adhesive backing for securing the sheeting to a sign backing 179. The "Scotchlite" Brand retroreflective material is available in various colors including yellow, orange, red, blue, and green.

Red and white retroreflective sheeting, for example, may be utilized to display the word STOP in white letters on a red background. The retroreflective substrate 170 may also include a non-reflective portion 174 forming a black symbol or message on a retroreflective background. For instance, a black right-hand turn arrow may be formed on a yellow retroreflective substrate.

In this embodiment, it may be desirable to have substantial message bleedthrough during the day. Therefore, when exposed to sunlight, the message of substrate 170 is visible through optical shutter 150 regardless of whether the optical shutter is in its field-on or field-off state. On the other hand, at night, incident light is effectively scattered by the optical shutter when in the field-off state, preventing a view of the message. However, in the field-on state, incident light from a collimated light source, such as automobile headlights, is transmitted by the optical shutter, permitting a view of the message by an observer at the collimated light source.

Thus, at night, there is a vivid contrast between the field-off and field-on states. In the field-off state, the sign appears very dark, while in the field-on state, the color or colors of the retroreflective substrate and thus the message are clearly visible.

At night, optical shutter 150 may be flashed between the field-on and field-off states to create the effect of a flashing sign. Although the optical shutter is continuously flashed between the field-on and the field-off states, the sign flashing effect will only be observed by observer A in viewing region 180 when collimated light strikes the sign.

One advantage of the embodiment of FIGS. 19–21 is the elimination of framing. Since the various components of the sign may be laminated to each other, it is unnecessary to provide a separate frame for supporting the sign components. However, if desired, additional structural support may be provided by way of a separate frame.

Figure 22:
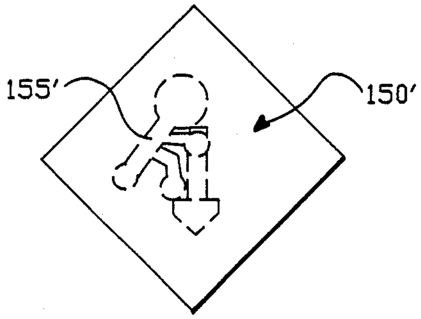
FIG. 22 is a schematic front view of a sign utilizing a patterned optical shutter.

A patterned optical shutter 150' (See FIG. 22) may also be utilized in the context of the present invention. A patterned optical shutter may have a dot matrix format consisting of rows and columns of pixel elements or a format comprising an unvarying verbal message and/or graphic image formed by pixel elements. The pixel elements (and the verbal and/or graphic image) are formed by appropriately patterning one or more of the electrodes of the optical shutter. The retroreflective substrate would not bear a message. Rather, it would form a reflective background for the message formed by the patterned optical shutter. For example, one or more of the electrodes, such as electrode 155' of optical shutter 150', may be patterned to form a graphic image such as the men working triangular symbol depicted in FIG. 22. Various dot matrix formats, such as 6×8 or 8×16, may also be utilized and are appropriately driven to display variable messages.

In this embodiment at night, when the sign is illuminated by a collimated light source such as a headlight and observed in an area in front of the sign from a small divergent angle, off pixels obscure the effect of the retroreflective material while on pixels allow the retroreflective material to be viewed. This provides a message image via brightness and/or color contrast between on and off pixels. During the day, again off pixels obscure the effect of the retroreflective material while on pixels allow the retroreflective material to be viewed. This provides a message image via brightness and/or color contrast between on and off pixels.

Figure 23:
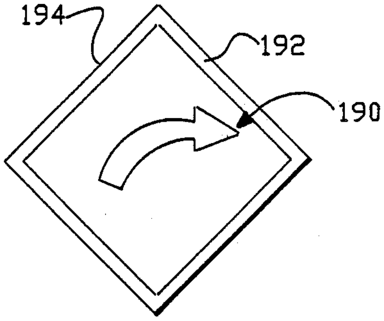
FIG. 23 is a schematic front view of a further embodiment of the invention.

FIG. 23 illustrates an embodiment of the invention, producing a "halo" effect. This embodiment comprises an advisory sign having a message portion 190 bordered by an optical shutter 192. Message portion 190 may be a standard traffic sign, for example the right-hand turn arrow sign illustrated, joined to a larger sign blank 194 of the same configuration. For example, the traffic sign may be diamond shaped and be four feet by four feet; sign blank 194 would also be diamond shaped and be five feet by five feet. The optical shutter 192 could then form a six inch border about the perimeter of the sign.

The optical shutter 192, as discussed with reference to the embodiment of FIGS. 19–21, may be laminated to sign blank 194 to form the appropriate border. The sign blank and the message portion may be constructed of retroreflective sheeting (a black arrow would be a non-reflective portion of the sign) such that a flashing "halo" effect is produced when the optical shutter is sequentially switched between the field-off and field-on states. Specifically, at night, when the sign is illuminated by a collimated light source such as headlights and observed from a small divergent angle in a region in front of the sign, optical shutter 192 in the field-on state allows the retroreflective material of the sign blank to be viewed. However, when optical shutter 192 is in the field-off state, the retroreflective surface of the sign blank is obscured. During the day, the optical shutter in the field-off state obscures the true color of the retroreflective surface, but in the field-on state, it permits a view of the retroreflective surface.

Thus, a flashing colored border may be produced. In one particularly effective arrangement, the portion of sign blank 194 to which optical shutter 192 is coupled may comprise black non-reflective sheeting and yellow retroreflective sheeting arranged in the form of alternating black and yellow stripes.

The "halo" effect may also be utilized in the sign embodiment of FIGS. 1–6 wherein the optical shutter is spaced from sign blank 194 to produce an air gap therebetween. In this embodiment, the portion of the sign blank directly behind the optical shutter is obscured when the shutter is in the field-off state. In the field-on state, however, that portion of the sign blank is visible. However, in the field-on state, incident light is transmitted through the optical shutter such that the portion of sign blank 194 behind the optical shutter is visible. This provides a brightness and/or color contrast effect.

While the above provides a full and complete disclosure of the invention, various modifications, alternate constructions and equivalents may be employed without departing from the true spirit and scope of the invention. For example, if desired the multiple sign embodiment of FIG. 7 may be divided further into upper and lower quadrants, octets, or any other suitable geometrical configuration to provide various combinations of sequential activation and deactivation of optical shutter assemblies. In addition, other sign and optical shutter assembly mounting arrangements may be employed, as desired. Still further, the optical shutter assembly can be operated with different on/off duty cycles than the fifty percent duty cycle described above, and different power sources may be employed, such as a direct coupling to standard 110 VAC power lines, depending on the operating voltage characteristics of the shutter sheet material. Therefore, the above description and illustrations should not be construed as limiting the scope of the invention, which is defined by the appended claims.

What is claimed is:

1. For use with a conventional advisory sign having a visible message, and optical shutter device for alternately blocking and transmitting the message, said device comprising:

spacer means attached to the sign in front of the message;

electrically operable optical shutter means coupled to said spacer means for alternately blocking and transmitting light between the message and a viewing region in front of said device; and hanger means for removably attaching said spacer means to the sign such that said optical shutter means is in front of the message.

2. The invention of claim 1 wherein said spacer means includes a perimetral portion circumscribing the perimeter of the sign to shield the message from ambient light when said optical shutter means is in the light blocking state.

3. The invention of claim 1 wherein said optical shutter means includes a planar sheet of liquid crystal material.

4. The invention of claim 3 wherein said spacer means includes a front flange portion and a rearwardly spaced mounting member, and wherein said sheet is received between said flange portion and said mounting member.

5. The invention of claim 3 wherein said sheet is adhered to a transparent stiffener plate.

6. The invention of claim 3 wherein said sheet is laminated between a pair of transparent stiffener plates.

7. The invention of claim 1 further including electrical power supply means coupled to said optical shutter means for sequentially controlling the state thereof.

8. The invention of claim 1 wherein said message is formed on a retroreflective substrate.

9. The invention of claim 7 wherein said optical shutter means further includes a pair of electrically conductive strips located along different edges thereof for enabling electrical connection with said power supply means.

* * * * *

UNITED STATES PATENT AND TRADEMARK OFFICE
CERTIFICATE OF CORRECTION

PATENT NO. : 4,893,903

DATED : January 16, 1990

INVENTOR(S) : D. Thakar and M. Thakar

It is certified that error appears in the above-identified patent and that said Letters Patent is hereby corrected as shown below:

Column 2, line 16, delete "unlight" and insert --sunlight--.

Claim 1, column 13, line 21, delete "and" and insert --an--.

Signed and Sealed this

Twenty-fifth Day of June, 1991

*Attest:*

HARRY F. MANBECK, JR.

*Attesting Officer*

*Commissioner of Patents and Trademarks*